US008876331B2

(12) United States Patent
Waring

(10) Patent No.: US 8,876,331 B2
(45) Date of Patent: *Nov. 4, 2014

(54) ANNULAR LIGHTING FIXTURE AND METHOD FOR ILLUMINATION

(76) Inventor: Jennifer S. Waring, South Kingstown, RI (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/489,061

(22) Filed: Jun. 5, 2012

(65) Prior Publication Data

US 2012/0243246 A1 Sep. 27, 2012

Related U.S. Application Data

(63) Continuation of application No. 12/316,230, filed on Dec. 10, 2008, now Pat. No. 8,192,061.

(51) Int. Cl.
*F21V 21/00* (2006.01)
*B60Q 1/26* (2006.01)
*B62J 6/00* (2006.01)
*F21Y 101/02* (2006.01)
*F21S 9/02* (2006.01)
*F21W 101/027* (2006.01)
*F21Y 103/02* (2006.01)

(52) U.S. Cl.
CPC ........... *B60Q 1/2696* (2013.01); *F21Y 2101/02* (2013.01); *B62J 6/00* (2013.01); *F21S 9/02* (2013.01); *F21W 2101/027* (2013.01); *F21Y 2103/022* (2013.01); *B60Q 1/2657* (2013.01)
USPC ................. 362/249.14; 362/240; 362/249.04; 362/431; 362/473

(58) Field of Classification Search
CPC ........... B62J 6/00; B60Q 1/26; B60Q 1/2657; B60Q 1/2696; F21S 9/02; F21W 2101/027; F21Y 2102/02; F21Y 2103/022
USPC ............ 362/33, 240, 249.02, 249.04, 249.06, 362/249.14, 431, 473–476, 800
See application file for complete search history.

(56) References Cited

U.S. PATENT DOCUMENTS

| 5,856,779 | A  | * | 1/1999  | Friday .......................... 340/479 |
| 5,871,269 | A  |   | 2/1999  | Chien |
| 6,183,100 | B1 | * | 2/2001  | Suckow et al. .................. 362/35 |
| 6,322,237 | B1 | * | 11/2001 | Lee ................. 362/500 |
| 6,655,823 | B2 | * | 12/2003 | Chang .......................... 362/487 |
| 6,830,363 | B2 |   | 12/2004 | Pisula |
| 6,982,633 | B2 |   | 1/2006  | Burdick |
| 7,079,041 | B2 |   | 7/2006  | Fredericks |
| 7,287,876 | B2 |   | 10/2007 | Lin |
| 2004/0076003 | A1 |   | 4/2004 | Collura et al. |

* cited by examiner

*Primary Examiner* — Stephen F Husar
(74) *Attorney, Agent, or Firm* — Roger A. Gilcrest

(57) ABSTRACT

An annular lighting fixture having a housing, a channel, and a plurality of lights disposed in the channel. The fixture can be attached about a tubular portion of a motorcycle. In one embodiment, the plurality of lights are light emitting diodes surface mounted on a flexible printed circuit board disposed in the channel. In another embodiment a collimator is associated with each LED unit to redirect light in a desired direction. In another embodiment reflective portions are arranged on respective sides of the channel so as to redirect light in a desired direction. A method is also provided herein for the illumination of a vehicle.

17 Claims, 4 Drawing Sheets

ANNULAR LIGHTING FIXTURE AND METHOD FOR ILLUMINATION

RELATED APPLICATION DATA

This application is a continuation of U.S. application Ser. No. 12/316,230, filed Dec. 10, 2008, now U.S. Pat. No. 8,192,061, which is hereby incorporated in its entirety herein by reference.

FIELD OF THE INVENTION

The present invention relates to an annular lighting fixture comprising a housing having a channel and a plurality of lights in the channel, adapted for use on a vehicle. More particularly the invention relates to an annular lighting fixture having a channel and a plurality of LEDs surface mounted on a printed circuit board, adapted for mounting about a tubular portion of a vehicle. The lighting fixture can also have a collimator which increases intensity of the emitted light in a given direction.

BACKGROUND OF THE INVENTION

Accent lighting for vehicles, specifically motorcycles has been desired for both aesthetics and safety. With respect to motorcycle safety, additional lighting provides increased visibility of the motorcycle to other drivers. Because of the inherent nature of a motorcycle, motorcyclists fare much worse than automobile drivers when an accident involves the two vehicles. Therefore, there is a need for providing as much visibility of a motorcycle as possible to improve safety.

Traditional turn signals and marker lamps provide illumination in one direction. There is a need for a lamp that provides visibility from greater number of angles than a traditional turn signal or marker lamp. The lamp of the present invention provides greater visibility, as its annular nature provides for other vehicles and pedestrians positioned at an angle to view the lamp more easily than a traditional turn signal. Further, as an auxiliary light used in conjunction with traditional turn signals the lamp of the present invention provides additional safety and aesthetic benefits.

Light emitting diodes ("LEDs") often emit light that is of a greater intensity than that of light emitted from an incandescent or other bulb. Therefore, when using LEDs for vehicular lighting, it is desirable to have a housing unit that maximizes the intensity of the emitted light. Collimators can increase intensity of emitted light by redirecting light that emits in a direction other than the desired emission direction. Other inventions have utilized collimators and reflectors to increase the intensity of light, however, those inventions are mainly directed toward increasing the intensity in one light emission direction, rather than in multiple emission directions.

In the area of turn signal lamps for motorcycles, many turn signals designs protrude from the fork tube or other portions of the motorcycle. This can detract from the motorcycle's overall aesthetics if a sleek or streamlined appearance is desired. Further, a protruding lamp can break off or bend during use, especially if the motorcycle falls over. Therefore, there is a need for a lamp structure that will decrease the likelihood of breakage and increase the overall durability of the vehicle.

The present invention can be utilized to increase the aesthetic appeal of a vehicle, increase visibility and safety of the vehicle, and provides a structure that improves the overall aesthetics of the vehicle.

SUMMARY OF THE INVENTION

The embodiments of the invention and the method described herein addresses the shortcomings of the prior art.

In general terms, the invention may be described as including the following:

Light Fixture

In general terms, the invention includes an annular lighting fixture comprising an annular housing having a channel and a plurality of lights disposed in the channel. The housing may also be an arcuate form.

In one embodiment, the plurality of lights runs the length of the channel at a viewing angle from preferably at least 60 degrees to preferably at most 270 degrees. The severity of curvature in the plurality of lights is related to the outer diameter of the annular housing, and can be larger or smaller depending on the size of the fixture.

In another embodiment, the invention also includes a translucent or transparent or translucent portion mounted over the plurality of lights. The transparent or translucent portion can be any material that allows penetration of the light emitted from the plurality of lights such as, but not limited to, any kind of glass or plastic. Further the portion may be colored to produce a colored light. For example, the transparent or translucent portion can be red or amber for use as a rear light on a vehicle or the transparent or translucent portion can be amber for use as a turn signal on a vehicle. The transparent or translucent portion may also be mounted over the plurality of lights to as to protect the plurality of lights from impact and the elements.

The invention also includes an embodiment in which the transparent or translucent portion is flush with the outer surface of the housing, providing a smooth outer surface with no protruding portions from the housing. The surface of the transparent or translucent portion may also be recessed from the surface of the housing.

In another embodiment, the plurality of lights is one or more LEDs. The invention is not limited to LEDs and could include any other light source such as, but not limited to, incandescent, halogen, xenon, HID, plasma, lithium ion, tungsten, or fluorescent light sources. The LEDs may be white or colored. For example, the LEDs can be red or amber for use as a rear light on a vehicle or the LEDs can be amber for use as a turn signal on a vehicle. The LEDs may also be any other color for use as accent lighting.

In one embodiment, the plurality of lights is one or more LEDs that are surface mounted on a flexible printed circuit board. The surface mount LEDs may be configured upon the flexible substrate, in an array connected to one another. The LED elements may be positioned in such an arrangement that adjacent elements are in physical contact with each other or they may be positioned at a greater distance from one another. The LED elements may be configured so as to be supplied with electricity. Further the LED elements may illuminate collectively, individually, or a combination thereof.

In another embodiment, two or more LED printed circuit boards are mounted in the channel. The circuit boards may be mounted in an end-to-end fashion in the channel or mounted running parallel to one another. The LEDs on each circuit board may be the same color or they may be different colors from one another. They also may vary in length and number of LEDs mounted on each circuit board. The circuit boards may operate to illuminate collectively, individually, or a combination thereof. Further, it should be understood that the present invention may have multiple channels in which circuit boards are mounted.

The fixture is adapted to attach about a tubular portion of a vehicle. This may include, but is not limited to, any portion of a fork tube, front end member, frame, grip, or handle bar of a motorcycle. Typical diameters of tubular portions of motorcycles include, but are not limited to, diameters between 35 millimeters and 60 millimeters. The fixture may have an inner diameter that corresponds to the outer diameter of the tubular portion about which the fixture is attached.

In another embodiment, the annular lighting fixture is attached about a tubular portion of a vehicle by mean which may include at least one set screw, adhesive, soldering, or a shim piece. Further, the fixture may be attached solely by means of an interference fit.

In another embodiment, an electrical lead is adapted to conduct electricity to the plurality of lights. The electrical lead may conduct electricity from any power source, including, but not limited to, the vehicle's battery, generator, alternator, or magneto.

In one embodiment, an electrical lead supplies electricity to the plurality of lights through a switch. This may allow the lamp to stay illuminated while the vehicle is turned on, or may allow for the lamp to illuminate at other times, such as when the brakes are applied. It may be appreciated that the invention in not limited to those particular uses if connected to a switch.

In another embodiment of the lighting fixture, an electrical lead supplies electricity to the plurality of lights from a relay, so as to allow the plurality of lights to operate as a turn signal or hazard light. The lighting fixture may operate independently as a turn signal or hazard light or may light up synchronously with existing turn signals or hazard lights on a vehicle to act as an auxiliary warning for increased visibility and safety. It may be appreciated that the invention is not limited to use as a turn signal. For example, the marker lamp may be used as an accent light, brake light, or auxiliary emergency flasher.

Annular Lighting Fixture with Collimator

In one embodiment, the annular housing has a vertical axis and the plurality of lights emit light along an emitting axis perpendicular to the vertical axis. In addition the housing has a first and second portion on either side of the channel, each with reflective or refractive surfaces that are arranged so as to reflect a portion of the light generated by the plurality of lights in a direction aligned with the emitting axis. The reflective or refractive surfaces are arranged in such a way to intercept light not emitted in the desired emission direction and redirect such light in the desired direction. The reflective or refractive surfaces thus adjust the intensity of the light in the desired emission direction. The reflective or refractive surfaces may be flat or concave.

In another embodiment, the plurality of lights emits an amount of light, a collimator is mounted above or surrounding all or a portion of each individual light, and the collimator is adapted so to reflect or refract a portion of the light generated by the individual light in a desired direction. The direction may be the same as the emitting axis direction, but is not limited to that direction.

Motorcycle with a Fixture

The present invention also provides for a motorcycle with a fixture, comprising a motorcycle and an annular lighting fixture comprising an annular housing, one or more channels, and a plurality of lights disposed in the one or more channels, attached about a tubular portion of the vehicle. In one embodiment the tubular portion of the vehicle is a fork tube. It should be appreciated that the fixture may attach about any other tubular portion of the motorcycle including any tubular portion of the motorcycle frame, front end, handle bar, or grips.

In another embodiment, one or more annular lighting fixtures are attached to one or more tubular portions of the motorcycle. More than one lighting fixtures may be arranged adjacent to or in proximity with one another on the same general tubular portion. Alternatively, different or multiple tubular portions may have one or more lighting fixtures attached to each. For example, the left and right portions of handle bars, or the left and right fork tubes, on a motorcycle could each have one or more lighting fixtures attached.

It should be appreciated that the fixture may attach about a tubular portion of any other vehicle including, but not limited to snowmobiles, all terrain vehicles, scooters, or bicycles.

Method of Illuminating a Vehicle

The present invention also includes a method of illuminating a vehicle. The method provides for attaching an annular lighting fixture to a tubular portion of a vehicle, the lighting fixture comprising an annular housing having a channel and a plurality of lights disposed in the channel; emitting light from the plurality of lights; and operating the vehicle so as to provide electrical energy to the lighting fixture.

It may be understood that all disclosed features of the present invention may be utilized to the extent that they are not logically inconsistent with one another.

BRIEF DESCRIPTION OF THE DRAWINGS

FIG. 4 is a side elevation view of a first lateral side of the light fixture in accordance with one embodiment of the present invention, and of which

FIG. 5 is a side elevation view of a second lateral side of the light fixture in accordance with one embodiment of the present invention, and of which FIG. 4 is the reverse side thereof;

FIG. 6 is a side elevation view of a third lateral side of the light fixture in accordance with one embodiment of the present invention, and of which

FIG. 7 is a side elevation view of a fourth lateral side of the light fixture in accordance with one embodiment of the present invention, and of which FIG. 6 is the reverse side thereof.

DETAILED DESCRIPTION OF THE PREFERRED EMBODIMENTS

In accordance with the foregoing summary, the following describes a preferred embodiment of the present invention which is considered to be the best mode thereof. With reference to the drawings, the invention will now be described in detail with regard for the best mode and preferred embodiment.

Figure 1:
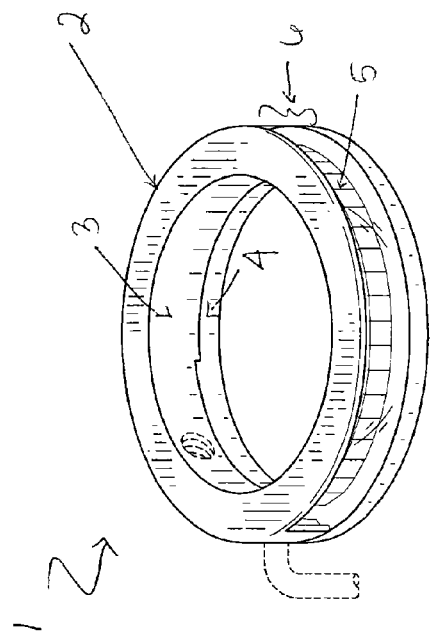
FIG. 1 is an upper side perspective view of a light fixture in accordance with one embodiment of the present invention.

FIG. 1 shows an upper side perspective view of the lighting fixture 1 in accordance with one embodiment of the present invention. FIG. 1 shows the fixture having a housing 2. The housing of the present invention may be made of any stable material such as a metal or a high strength plastic. A number of different types of materials may be used for making the housing of the present invention. Preferably, the material is aluminum that can be cast or machined into the desired shape. The present invention could also be constructed of a plastic that can be molded or machined into the desired shape. The housing of this invention is preferably two members formed of suitable material such as aluminum, which may be made by any appropriate method. The housing includes structural features designed to easily allow construction of the lighting fixture, which preferably includes two members held together by two set screws.

Figure 3:
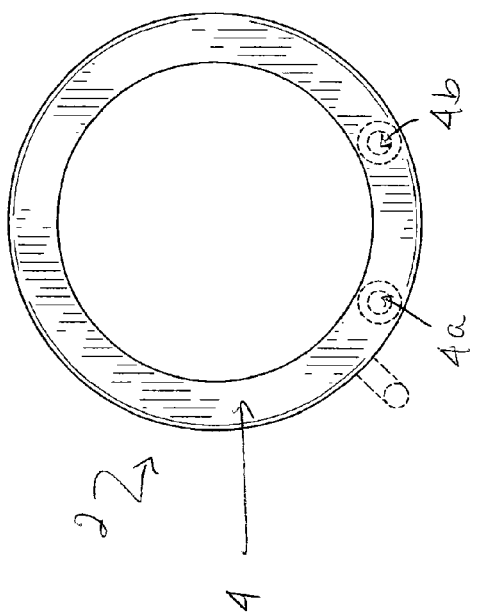
FIG. 3 is a bottom plan view of a light fixture in accordance with one embodiment of the present invention.

FIG. 1 shows the housing 2 having two portions: top portion 3 and bottom portion 4. The two portions of the fixture may be held together by any means including but not limited adhesive, soldering, or by one or more set screws or fasteners. In the preferred embodiment the two portions are held together by two screws. FIG. 3 shows the exterior of bottom portion 4 of housing 2 having two screws 4a and 4b.

FIG. 1 shows fixture 1 having plurality of lights 5 disposed in channel 6. The plurality of lights may be any light source such as incandescent, fluorescent, xenon, HID, plasma, lithium ion, tungsten, or halogen light sources. In one embodiment the plurality of lights may comprise LEDs. Preferably, the LEDs are surface mounted on a flexible circuit board, such as the compact, flexible LED array disclosed in U.S. Pat. No. 6,371,637, which is incorporated by reference. The LEDs may be provided in a variety of colors, including white, red, yellow, green, amber, and blue. In one embodiment, the LEDs are amber for use as a turn signal. In another embodiment of the invention the LEDs are in a clear epoxy solution, making the LEDs waterproof. The flexible circuit board can be adhesively secured in the channel. In the preferred embodiment a single row of LEDs is present on the flexible circuit board, however, more than one row may be placed on the flexible circuit. In addition, more than one flexible circuit boards may be disposed in the channel. The circuit boards may be powered individually so as to illuminate the LEDs on one or more boards separately or, alternatively, the circuit boards may be powered so as to allow some or all of the LED boards to illuminate as a group.

Figure 2:
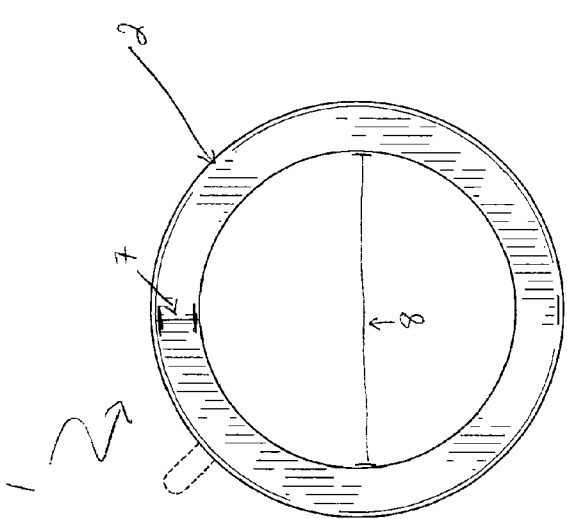
FIG. 2 is a top plan view of a light fixture in accordance with one embodiment of the present invention.

FIG. 2 shows a top plan view of the lighting fixture in accordance with one embodiment of the present invention. FIG. 2 shows housing 2 having a thickness 7. In the preferred embodiment of the invention, the housing has a thickness of about 6.35 mm. The housing thickness may be greater or lesser depending on the characteristics of the plurality of lights disposed in channel and the desired aesthetic appearance of the lighting fixture.

FIG. 2 shows fixture 1 having an inner diameter 8. The fixture typically will have an inner diameter that corresponds to the outer diameter of any tubular portion about which it is attached. Typically, for attachment about a fork tube of a motorcycle, the inner diameter will be from about 40 mm to about 60 mm. In the preferred embodiment of the invention the inner diameter is about 41.3 mm. The fixture may also have an inner diameter that corresponds to any outer diameter of handle bar or any other tubular portion of a motorcycle.

Figure 4:
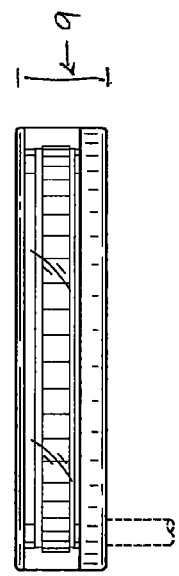

FIG. 4 is a side elevation view of a first lateral side of fixture 1 in accordance with one embodiment of the present invention. FIG. 4 shows fixture 1 having a height 9. Typically, the height of the fixture will depend on the quantity and size of the LED circuit boards disposed in the channel. In the preferred embodiment of the invention, the fixture has a height of about 11.1 millimeters (mm).

Figure 5:
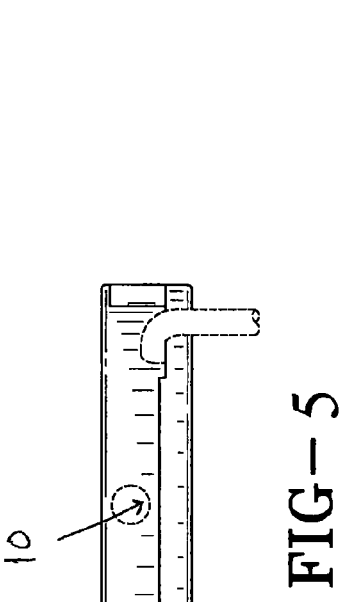
FIG. 5 is the reverse side thereof.

FIG. 5 shows fixture 1 from a side elevation view of a first lateral side. FIG. 5 shows the fixture having an opening 10 for insertion of a set screw. In the preferred embodiment, a set screw provides the means for attachment about a tubular portion of a motorcycle. If necessary, holes can be drilled on a tubular portion for receiving a screw, pin, or other fastener. In one embodiment the fixtures can be attached about the tubular portion by means of an interference fit. In another embodiment, the fixture may be attached about the tubular portion of a motorcycle by means of an adhesive, soldering, or shim piece.

Figure 6:
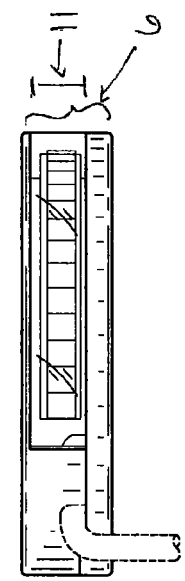

FIG. 6 shows fixture 1 having a channel 6 having a channel height 11. Typically, the channel height will depend on the quantity and size of the LED circuit boards disposed in the channel. In the preferred embodiment of the invention, channel 6 has a channel height 7 of about 7.9 mm.

Figure 7:
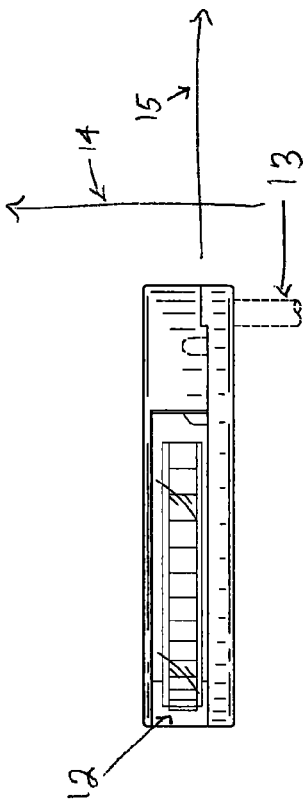
FIG. 7 is the reverse side thereof.

FIG. 7 shows the fixture having a transparent or translucent portion 12. The transparent or translucent portion can be any material that allows penetration of the light emitted from the plurality of lights such as, but not limited to, any kind of glass or plastic. Further the portion might suitably be provided with its transparency only in areas where it is desirable for light to be emitted. The entire portion, or portions thereof, might be configured to be clear without color, to provide a certain look, with the plurality of lights being constructed to emit a certain color of light. Alternatively, the plurality of lights might be selected to emit a white light, with the portion being colored. In one embodiment the portion is amber for use as a turn signal on a vehicle. In another embodiment, the portion may also function so to as to protect the plurality of lights from impact and the elements.

The invention also includes an embodiment in which the transparent or translucent portion is flush with the outer surface of the housing, providing a smooth outer surface with no protruding portions from the housing. The surface of the transparent or translucent portion may also be recessed from the surface of the housing.

FIG. 7 also shows the fixture having an electrical lead 13. In one embodiment, power may be supplied externally by an external voltage supply which might be implemented as a battery, an AC to DC converter, or some other direct current power source which provides a power supply voltage which, in turn, might range from about 3 to about 20 volts. Power may also be supplied through a relay, such as a turn signal relay, to allow the fixture to operate as a turn signal. Further, power may be supplied through a switch that would allow the lamp to illuminate, for example, when the vehicle is turned on.

In one embodiment, the annular housing has a vertical axis 14, as shown in FIG. 7, and the plurality of lights emit light along an emitting axis 15 perpendicular to the vertical axis. In addition the housing has a first and second portion on either side of the channel, each with reflective surfaces that are arranged so as to reflect a portion of the light generated by the plurality of lights in a direction aligned with the emitting axis. The reflective surfaces are arranged in such a way to intercept light not emitted in the desired emission direction and redirect such light in the desired direction. The reflective surfaces thus increase the intensity of the light in the desired emission direction. The reflective surfaces may be flat or concave. The reflective surfaces may be any material that sufficiently reflects light so as to direct the light in the desired direction. In one embodiment the reflective surfaces may comprise a portion of the housing. Alternatively, in another embodiment, the reflective surfaces may comprise additional portions attached to the fixture housing or disposed in the channel 6.

In another embodiment, the plurality of lights emits an amount of light, a collimator is mounted above each individual light, and the collimator is adapted so as to reflect a portion of the light generated by the individual light in a desired direction. The direction may be the same as the emitting axis direction, but is not limited to that direction. Preferably, the collimator is arranged above the LED in an arrangement such as that disclosed in U.S. Pat. No. 7,396,139, which is hereby incorporated herein by reference.

Figure 8:
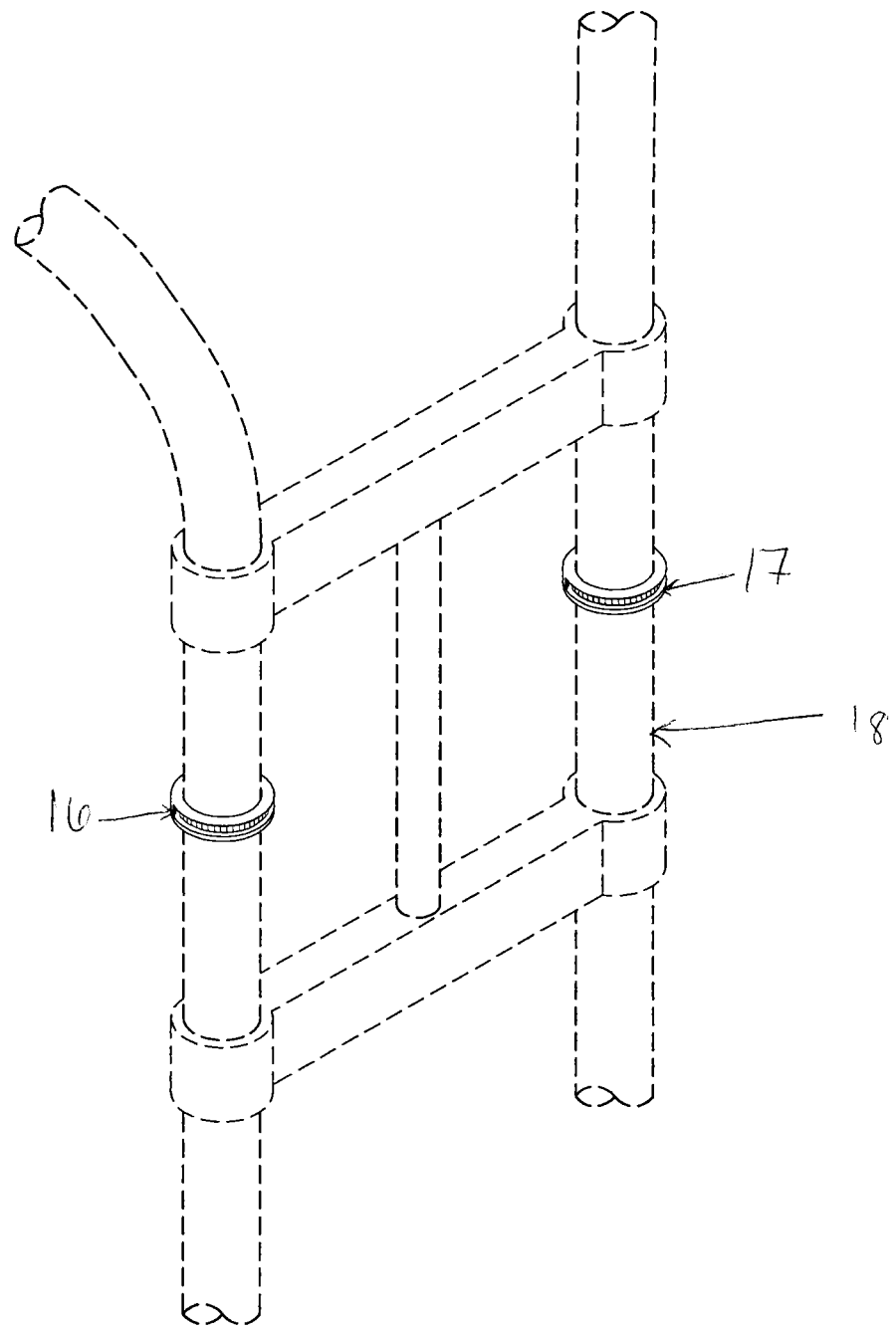
FIG. 8 is an upper side perspective view of two of the light fixtures in accordance with one embodiment of the present invention, shown attached about the front suspension fork of a motorcycle.

FIG. 8 shows lighting fixtures 16 and 17 attached about fork tubes 18 of a motorcycle. As mentioned previously, the fixtures may be attached about a fork tube by means of a set screw or other means. Additionally, the fixtures may be attached about any other tubular portion, such as, but not limited to, handle bars, grips, or any tubular portion of the frame.

In another embodiment, one or more annular lighting fixtures are attached to one or more tubular portions of the motorcycle. More than one lighting fixture may be arranged adjacent to, or in proximity with, one another on the same tubular portion or different tubular portions may have one or more lighting fixtures attached. For example, the left and right sides of the handle bars on a motorcycle could each have one or more lighting fixtures attached.

It should be appreciated that the fixture may attach about a tubular portion of any other vehicle including, but not limited to snowmobiles, all terrain vehicles, scooters, or bicycles.

Figure 9:
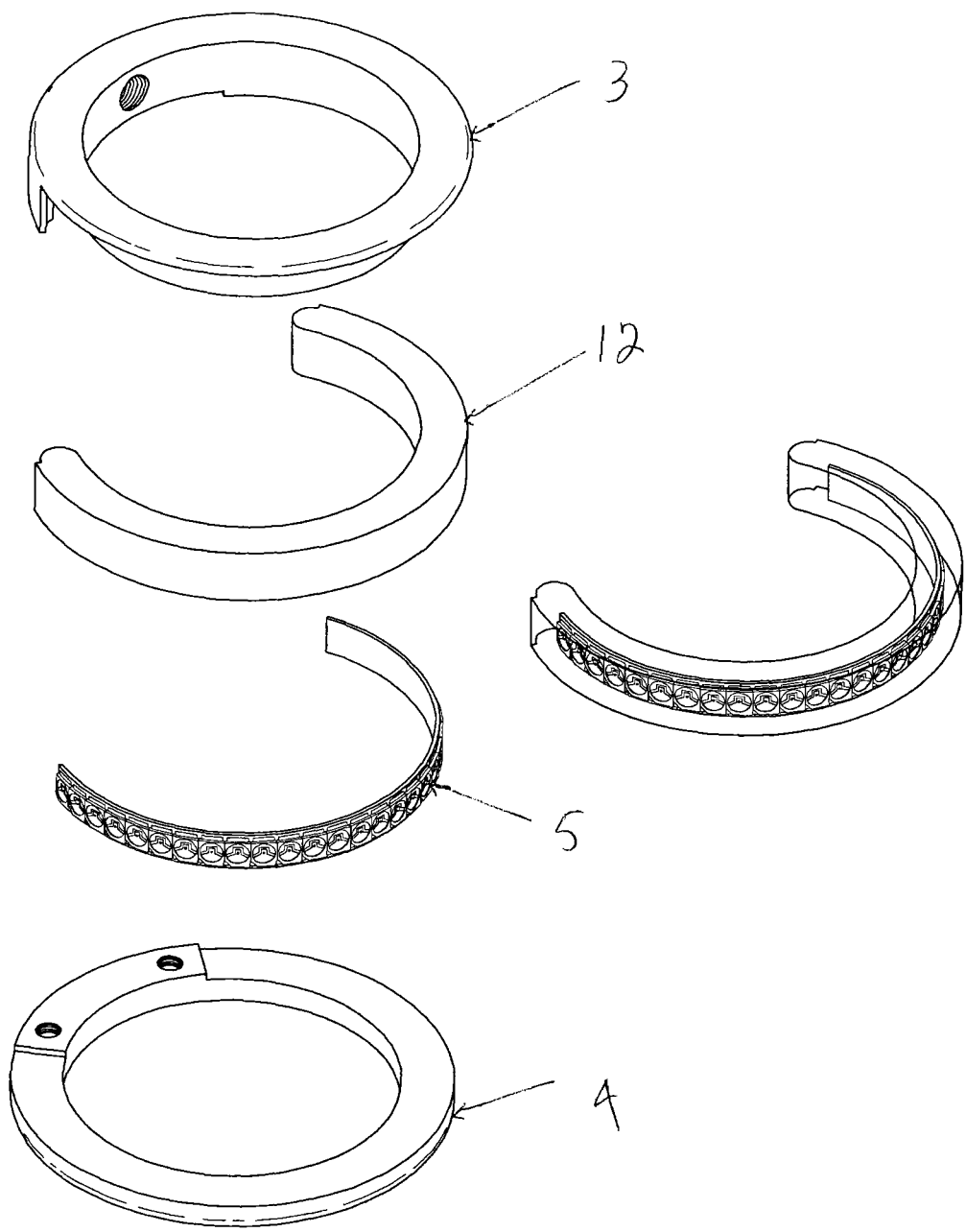
FIG. 9 is an exploded view of a light fixture in accordance with one embodiment of the present invention.

FIG. 9 shows an exploded view of lighting fixture 1 having a top housing portion 3; a transparent or translucent portion 12; a plurality of lights 5; and a bottom housing portion 4.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claims, including the full range of equivalency to which each element thereof is entitled.

What is claimed is:

1. An annular lighting fixture, comprising:
   an annular housing comprising a top portion and a bottom portion;
   a channel defined by said top portion and said bottom portion;
   a transparent or translucent portion disposed between said top portion and said bottom portion in said channel; and
   a plurality of lights disposed in said channel.

2. The fixture according to claim 1 wherein said plurality of lights sweeps at a viewing angle of from not less than 60 degrees to not more than 270 degrees.

3. The fixture according to claim 1 wherein said plurality of lights comprises one or more light emitting diodes.

4. The fixture according to claim 1 wherein said fixture additionally comprises one or more circuit boards and wherein said plurality of lights comprises light emitting diodes mounted upon said one or more circuit boards.

5. The fixture according to claim 1 wherein said fixture additionally comprises one or more flexible circuit boards and wherein said plurality of lights comprises light emitting diodes mounted upon said one or more flexible circuit boards.

6. The fixture according to claim 1 additionally comprising a means to attach said fixture about a tubular portion of a vehicle.

7. The fixture according to claim 6 wherein said means for attaching is selected from the group consisting of adhesive, soldering, shim piece, retainer, pin, adhesive tape, or at least one set screw.

8. The fixture according to claim 1 additionally comprising an electrical lead adapted to conduct electricity to said plurality of lights.

9. The fixture according to claim 8 wherein said electrical lead is supplied electricity from a relay, so as to allow said plurality of lights to flash automatically upon activation.

10. The fixture according to claim 8 wherein said electrical lead is supplied electricity from a switch, so as to allow said plurality of lights to illuminate upon activation.

11. A motorcycle with a fixture according to claim 1, having a tubular portion, and said fixture attached about said tubular portion.

12. A motorcycle with a fixture according to claim 3, having a tubular portion, and said fixture attached about said tubular portion.

13. A motorcycle with a fixture according to claim 5, having a tubular portion, and said fixture attached about said tubular portion.

14. An annular lighting fixture having a vertical axis, comprising:
   an annular housing comprising a top portion and a bottom portion;
   a channel defined by said top portion and said bottom portion;
   a transparent or translucent portion disposed between said top portion and said bottom portion in said channel; and
   a plurality of lights having an emitting axis perpendicular to said vertical axis disposed in said channel.

15. The fixture according to claim 14 wherein said plurality of lights emits an amount of light, said housing having one or more portions on one or more sides of said channel, said one or more portions having a reflective surface wherein said one or more portions are arranged so as to reflect a portion of the light generated by said plurality of lights in a direction aligned with the desired said emitting axis of said plurality of lights.

16. The fixture according to claim 14 a wherein said plurality of lights emits an amount of light, additionally comprising at least one collimator mounted in relation to one or more of said plurality of lights, wherein said collimator is adapted so as to reflect a portion of said amount light emitted by one or more of said plurality of lights in a direction aligned with the desired said emitting axis of one or more of said plurality of lights.

17. A method for illuminating a vehicle, said method providing:
   attaching an annular lighting fixture to a tubular portion of a vehicle, wherein said fixture comprises: an annular housing comprising a top portion and a bottom portion and having a channel defined by said top portion and said bottom portion, a transparent or translucent portion disposed between said top portion and said bottom portion in said channel, and a plurality of lights disposed in said channel; emitting light from said plurality of lights; and operating said vehicle so as to provide electrical energy to said fixture.

* * * * *